United States Patent [19]

Provonchee

[11] Patent Number: 4,701,754
[45] Date of Patent: Oct. 20, 1987

[54] INDICATOR DEVICE FOR SUBSTANCE RECEIVING WELLS IN A MICROTITER PLATE

[75] Inventor: Richard B. Provonchee, Camden, Me.

[73] Assignee: FMC Corporation, Philadelphia, Pa.

[21] Appl. No.: 724,382

[22] Filed: Apr. 18, 1985

[51] Int. Cl.⁴ .................................................. G08B 5/22
[52] U.S. Cl. .............................. 340/815.03; 340/332; 340/782; 422/67; 436/809
[58] Field of Search ............. 340/286 M, 802, 825.19, 340/742, 794, 332, 286 R, 815.03, 782, 762; 422/73, 67, 63, 104, 65, 102, 99; 312/209, 211; 604/403, 404; 350/239; 435/301, 293; 356/436, 440; 436/809; 116/202, 244, 306, 307

[56] References Cited

U.S. PATENT DOCUMENTS

| | | | |
|---|---|---|---|
| 3,554,703 | 1/1971 | Moss | 23/253 |
| 3,806,911 | 4/1974 | Pripusich | 340/802 |
| 3,948,606 | 4/1976 | Johnson | 23/259 |
| 4,024,530 | 5/1977 | Hughes | 340/332 |
| 4,072,578 | 2/1978 | Cady et al. | 195/127 |
| 4,207,289 | 6/1980 | Weiss | 422/104 |
| 4,273,416 | 6/1981 | Blum | 350/239 |
| 4,284,725 | 8/1981 | Fennel, III et al. | 435/301 |
| 4,319,841 | 3/1982 | Suovaniemi et al. | 356/244 |
| 4,498,782 | 2/1985 | Proctor et al. | 356/436 |
| 4,509,212 | 4/1985 | Baker | 356/436 |
| 4,545,958 | 10/1985 | Dopatka | 436/809 |

Primary Examiner—James L. Rowland
Assistant Examiner—Brent A. Swarthout
Attorney, Agent, or Firm—Christopher Egolf; Robert M. Kennedy; Eugene G. Horsky

[57] ABSTRACT

A Well Indicating Device which is useful in laboratory procedures for identifying, in a predetermined but variable sequence, wells of a plurality fo independent but interrelated substance-receiving wells, such as of a microtiter tray, which are subject of manipulation.

7 Claims, 4 Drawing Figures

INDICATOR DEVICE FOR SUBSTANCE RECEIVING WELLS IN A MICROTITER PLATE

BACKGROUND OF THE INVENTION

The present invention is directed to a device which is particularly useful in laboratory procedures for indicating which of a plurality of independent but interrelated substance-receiving wells is subject of manipulation.

In various investigations or studies, such as virus titration testing, complement fixation and other immunoassays, and hybridoma and other cell culture studies, performed at medical, research, and manufacturing facilities, employed are a plurality of substance-receiving wells which are subject of manipulation; that is, wells in which at least one substance has been or is to be added or removed, agitated, heated, cooled, irradiated, or otherwise physically or chemically changed or modified. Typical of such plurality of substance-receiving wells are conventional microtiter plates, or trays, as disclosed, for example, in U.S. Pat. No. 3,356,462, or simply a series of independent sample tubes fixed or removably supported within a suitable tube rack. As the gaze of an operator making such investigation or study may well be required to shift away from the substance-receiving well which has been or is to be manipulated; that is, "subject of manipulation", as for example, to pick-up a sample or reagent which is to be next added to such well, or give attention to an interruption or distraction, much too often the operator is not quite sure as to which of such wells is subject of manipulation. Obviously, an investigation or study may be punctuated with erroneous results, which may be life threatening, and, perhaps, sacrifice in valuable test substances or samples in the event one or more of such substance-receiving wells is, in error, not manipulated or repeatedly manipulated.

A common practice for identifying a well subject of manipulation is for the operator conducting an investigation or study to simply place a finger on or adjacent to the mouth of such well. In the absence of an interruption of the procedure or instinctive action by the operator in removing the finger from the well subject of manipulation, this manual well-identifying practice is generally satisfactory. Yet, while minimizing the problem of well identification, this common practice creates still other problems; namely, the possible contamination by the operator of a well subject of manipulation and/or the possible contamination of the operator by the substance(s) undergoing investigation and/or the reagents utilized in such investigation. Accordingly, a primary object of this invention is the provision of a new or improved device for identifying which if a plurality of independent but interrelated substance-receiving wells is subject of manipulation.

Another object of this invention is a device for identifying, in a predetermined sequence, wells of a plurality of independent but interrelated substance-receiving wells which are subject of manipulation.

Still another object of this invention is a device for identifying wells of a plurality of independent but interrelated substance-receiving wells which are subject of manipulation in a predetermined but variable sequence and in a manner as to avoid contamination of such wells and/or the user of the device.

SUMMARY OF THE INVENTION

These and other objects are accomplished in accordance with the present invention by a device which includes means for receiving a plurality of independent but interrelated, substance-receiving wells, means for use in identifying such of the independent wells subject of manipulation, control means, and means rendering the identifying means operative in a predetermined sequence upon actuation of the control means.

The plurality of substance-receiving wells may be, for example, a conventional microtiter plate, a rack supporting a series of independent fixed or removable sample tubes, or any other substance-receiving well means which is adapted to be received by and is receptive to the identification system of the device of the present invention.

It will be understood that the term "interrelated" as employed herein means that, while the wells are intended to function independently of each other, the plurality of wells are physically interconnected in the sense that they, for example, constitute a microtiter tray or are sample tubes fixed or removably supported within a rack, or similar substance-receiving means.

Regardless of whether such wells form part of an integral unit, as in the case of a microtiter plate, or are independently removable from a supporting rack or similar structure, it is essential that at least such of the wells that are to be employed in a particular study be arranged to at least generally conform with the arrangement of the identifying means of the present invention. Thus, with the appropriate selection for the arrangement for the identifying means, the present device may be used with a plurality of substance-receiving wells arrayed in one or more rows, in a circular or spiral pattern, or in any other desired configuration.

While a variety of means may be utilized for identifying such of the independent wells subject of manipulation, visible means, and specifically illuminating means, alone or in combination with an audible signal means, are preferred. An audible signal, for example, a buzzer such as a piezo buzzer, employed in combination with the illuminating means and sounding upon operation of the illuminating means may serve to give assurance to an operator that the illuminating means has in fact been actuated. In the specific embodiment of the invention hereinafter described in detail, the illuminating means includes a selectively illuminated indicator board which, while it may be operatively connected to but physically separated from the remainder of the device of the present invention, is preferably a structurally integral part of the deivce for the sake of simplicity, both in construction and use, portability, and compactness. If desired, light filters, colored and/or polarized, may be used to modify the light emitting from the illuminating means.

In a preferred embodiment, identification of the wells subject of manipulation is by illumination of such wells from the bottom. Side or top-illumination, while not preferred, is also contemplated and is within the scope of the present invention. Where identification of the wells involves perception (visual or otherwise) of a light transmitted through a wall of the wells, as, for example, where the wells are illuminated from the bottom and identification is to be made by visualization of transmitted light from the top, it is necessary, of course, that the material from which the wells are formed be capable of transmitting light; that is, transparent or translucent but not necessarily colorless, or that the wells have appropriately situated light-transmitting windows. Aside from the light-transmitting characteristic of the materials defining the substance-receiving wells and the well array conforming with the arrangement of the illuminating means for identifying wells subject of manipulation, the particular substance-receiving well system employed is otherwise not significant to the utility of the device of the present invention. Thus, in view of the widespread use of conventional, light-transmitting microtiter trays, and for the sake of simplicity and ease of description, the device of the present invention is hereafter described as used with such microtiter tray.

A conventional or "standard," light-transmitting microtiter tray is generally formed of stiff, transparent, plastic sheet, measures approximately 3¼ inches by 5 inches, and consists of ninety-six (96) like substance-receiving wells arrayed in a 12 by 8 grid, with the twelve wells in each of eight longitudinally extending rows being spaced from each other substantially equal distances and each of the eight rows being spaced like distances from directly adjacent rows. Thus, in the specific device here described, the indicator board includes ninety-six (96) illuminating means arranged in fixed positions in a 12 by 8 grid corresponding to that of the wells of the microtiter tray. The illuminating means may be, for example, incandescent lamps, electroluminescent means, or light-emitting diodes (LED's). Light-emitting diodes are preferred and are employed in the specific device hereafter described in detail. It will be understood passive indicators may also be used to identify wells subject of manipulation, such as a liquid crystal array which, rather than providing light, serve to block either transmitted or reflected light.

In addition to a power switch (on/off switch), the control means of the device includes an event or step switch for initiating the sequencing of the light-emitting diodes and may be any one of a variety of commercially available switches, such as a simple push button, or touch, optical, magnetic, or sound-actuated switch. The event switch, while operatively connected to the remainder of the device, may form a structurally integral part of the device or be physically remote from it.

Under the impulse provided by the event switch, sequencing of the LED's may be achieved mechanically or electromechanically and, more reliably and economically and thus preferably, electronically. The desired sequencing may be manually programmed by an operator presetting a switch or series of switches or it may be automatically programmed by a sensing device functionally connected to and used in conjunction with the present device, for example, an automatic microtiter tray reader. While the electronic circuit may be engineered to provide almost any desired lighting and sequencing, a circuit which provides for lighting, in sequence, an LED next adjacent to the one last lit with each actuation of the event switch is certainly satisfactory and is deemed to be most desirable. The LED's may be caused to light and flash, rather than light and stay lit, individually and in sequence upon actuation of the event switch, with the last LED set to flashing being extinguished and the next adjacent LED being lit and set to flashing with each actuation of the event switch. In a further embodiment of the present invention, the electronic circuit is engineered to provide for all of the LED's to be lit initially, conveniently upon actuation of the power switch, and for the LED's to be individually extinguished in sequence upon repeated actuation of the event switch.

In a preferred embodiment of the device, as the event switch is actuated, an appropriate LED will be lit to indicate the substance-receiving well subject of manipulation and, once lit, such LED remains lit so that there should be no doubt on the part of the operator as to the well subject to manipulation; that is, which well has been or is to be next manipulated. Accordingly, the device also includes a reset switch, and appropriate circuitry, to facilitate all, or all but the first, LED to be extinguished and thus place the indicating board in its initial condition.

While not essential to the operation, but certainly of utility and convenience, a fast forwarding LED switch and circuitry therefor are provided to facilitate rapid forward sequencing of the LED's as, for example, at the rate of about 12 positions (one longitudinally extending row of wells of a microtiter tray) per second. One advantage of such switch is that it assists in rapidly indicating the well subject of manipulation in the event an investigation is interrupted and the device is intentionally inactivated or used by others. For example, after a certain number of wells of a microtiter tray have been manipulated, the operator would record the position of the last well manipulated, as by well and row, and then temporarily remove the tray such as for irradiating substances in the manipulated wells. Upon replacing such tray in the device, the well next subject of manipulation can be rapidly indicated by fast forwarding the LED's until the desired row of LED's is achieved. This obviously minimizes the need to repeatedly actuate the event switch.

The electronic circuit of the preferred embodiment of the device of the present invention is also adapted to accommodate a selector or mode switch which, in one position, provides for sequencing of successive LED's in each longitudinal row of LED's consecutively and, in a second position, provides for sequencing of successive LED's consecutively in adjacent of such longitudinal rows of LED's.

It is contemplated that other features may be incorporated into the basic unit of the present device to satisfy a particular need or desire of a user. For example, in a preferred embodiment, one or more remote-jacks and circuitry therefor are provided in the present device to allow for multiple such devices to be operatively coupled or ganged together, with the operation of any single ganged device directing the simultaneous operation of all such ganged devices in a master-slave type of relationship. In this particular embodiment, therefore, a sole operator may conveniently control more than one of the present indicating devices in the same operation simultaneously from a single such device. The ganging together of multiple units of the present device is especially useful in large scale investigations or studies requiring the simultaneous use of multiple microtiter trays or other substance-receiving well systems, such as where multiple simultaneous titrations are made with automatic titration equipment.

BRIEF DESCRIPTION OF THE DRAWINGS

For a more detailed description of the device of the present invention, reference is made to the accompanying drawing in which.

DESCRIPTION OF THE PREFERRED EMBODIMENT

Figure 1:
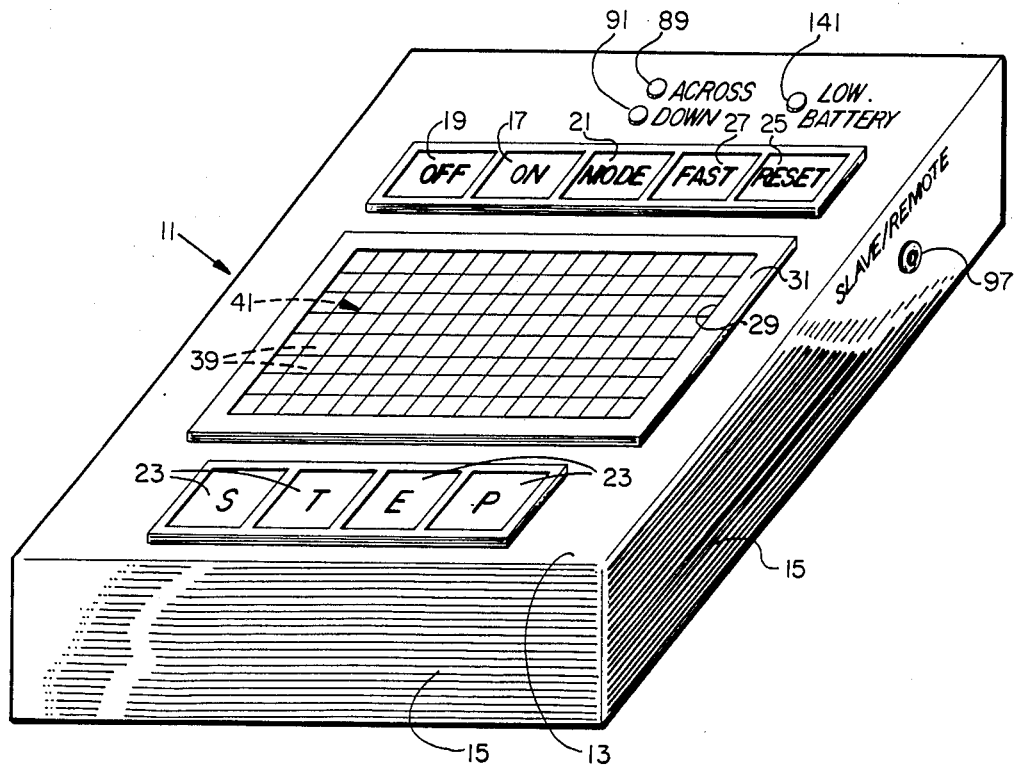
FIG. 1 is a perspective view of a preferred embodiment.

With reference to FIG. 1 of the drawing, the device includes a housing 11 having a top wall 13, side walls 15, and a bottom wall, not shown, which is removable to gain access into the device. The housing top wall 13 is formed with suitable openings to accommodate on/off push buttons 17 and 19 of a power switch, and also push buttons for mode, step or event, reset, and fast forward switches which are indicated in FIGS. 1 and 3 by characters 21, 23, 25, and 27, respectively, and a relatively large opening 29 which receives an overlying transparent window 31. Transparent window 31 projects above the housing top wall 13 and serves to accurately position a conventional 96-well microtiter tray, not shown, so that the substance-receiving wells thereof are aligned with a like number of light-emitting diodes (LED's) 39 which are fixed within a suitable matrix to provide an LED display board 41 as indicated in FIG. 2.

Figure 2:
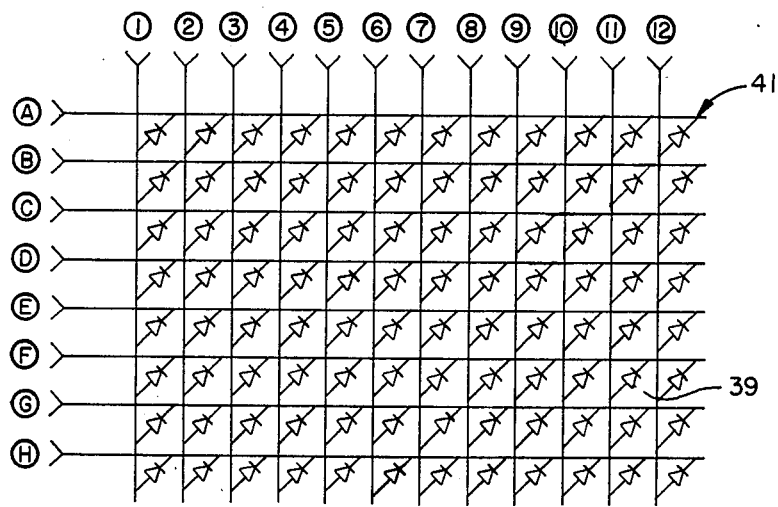
FIG. 2 is a diagrammatic view illustrating an array of light-emitting diodes (LED's) employed in the device shown in FIG. 1.
Figure 3:
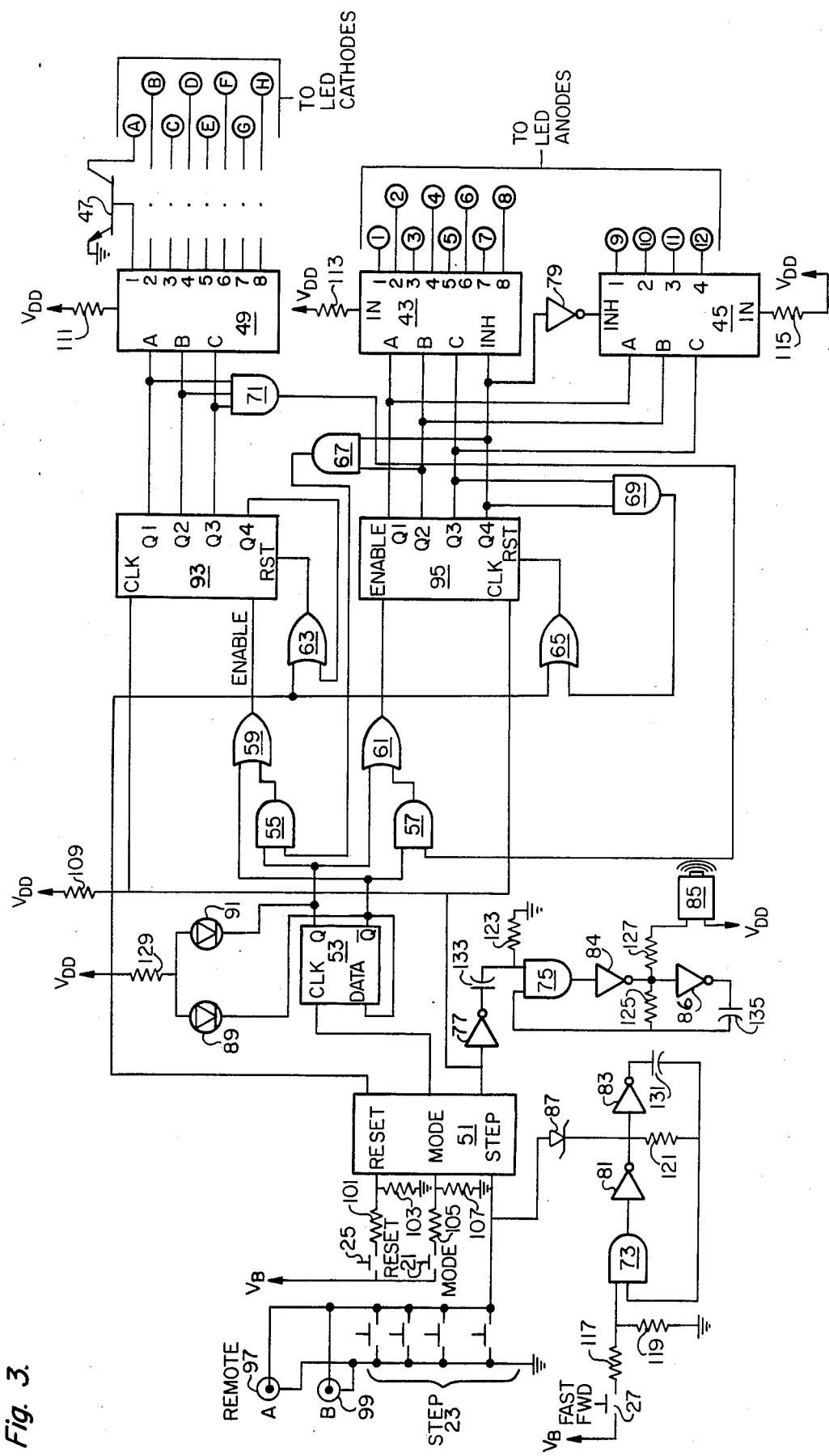
FIG. 3 is a schematic of an electronic circuit incorporated into the device shown in FIG. 1.

With further reference to FIG. 2, the light-emitting diodes 39 in each longitudinally extending row of diodes are designated as ①through ⑫, while the adjacent of such rows are designated as Ⓐ through Ⓗ. As shown in FIG. 3, the anodes of the light-emitting diodes 39 of the display board 41 are electrically connected to 8-channel analog multiplexer/demultiplexer units 43 and 45, while the cathodes thereof are likewise connected through transistors 47 to 8-channel analog multiplexer/demultiplexer unit 49.

With further reference to FIG. 3 of the drawing, in addition to the elements mentioned, included in the electronic circuit illustrated are:

(a) a contact bounce eliminator 51;
(b) flip-flop 53;
(c) logic gates 55, 57, 59, 61, 63 65, 67, 69, 71, 73, 75;
(d) inverting buffers 77, 79, 81, 83, 84, 86;
(e) a piezo buzzer 85;
(f) a diode 87;
(g) light-emitting diodes 89 and 91;
(h) dual synchronous up counter 93/95;
(i) remote jacks 97, 99;
(j) resistors 101, 103, 105, 107, 109, 111, 113, 115, 117, 119, 121, 123, 125, 127, 129;
(k) capacitors 131, 133, 135.

In the use of the device, once power is supplied by activating push button 17 and reset button 25 is pushed, the first light-emitting diode 39 in the top-most row, having anode ① and cathode Ⓐ, will be lit. If necessary, the mode switch 21 is operated to select the desired sequencing of the light-emitting diodes 39, either successively along consecutive longitudinal rows, whereupon the light-emitting diode 89 will be lit, or successively along consecutive of such rows, whereupon the light-emitting diode 91 will be lit.

Upon repeated actuation of the switch 23, sequencing of the light-emitting diodes 39 will occur in accordance with the mode selected. Thus, if the mode selected is to provide for sequencing of successive light-emitting diodes 39 along the longitudinal rows thereof; that is, in the "Across" mode thereof, the signals generated by the event switch 23 will act with the counter 95 controlling the sequencing of the twelve light-emitting diodes 39 along each longitudinal row of such diodes, while the counter 93 controls the longitudinal row in which the light-emitting diodes are to be sequentially activated. On the other hand, when the device is set for the "Down" mode, the signal generated by the event switch 23 will act with the counter 93 so that corresponding light-emitting diodes are sequentially activated in each of eight longitudinal rows, after which light-emitting diodes adjacent to the lit diodes are likewise sequenced through the control of counter 95.

With each activation of the event switch 23, the piezo buzzer 85 will sound together with the visible signal given by a light-emitting diode 39. Inverting buffers 77, 84, 86, logic gate 75, resistors 123, 125, and 127, and capacitors 133 and 135 together serve to drive the piezo buzzer 85 for a short burst coincident to each activation of the event switch.

Activating the reset switch 25 causes the counters 93 and 94 to extinguish all but the anode ①, cathode Ⓐ light-emitting diode. Inverting buffers 81 and 83, logic gate 73, resistors 117, 119, and 121, capacitor 131, and diode 87 together serve to create an oscillator circuit which, when activated by the fast forward switch 27, rapidly activates the light-emitting diodes 39 in accordance with the mode selected, either "Across" or "Down."

Switch 21, flip-flop 53, logic gates 55, 57, 59, and 61, and light-emitting diodes 89 and 91 together provide the logic and visual indication for the selection of the "Across" or "Down" mode.

Switch 25, logic gates 63, 65, and 69 provide the reset functions.

Logic gates 67 and 71 provide for the carry function between counters 93 and 95.

Resistors 101, 103, 105, 107, 109, 111, 113, 115, 127 and 129 provide current limiting and voltage biasing.

Figure 4:
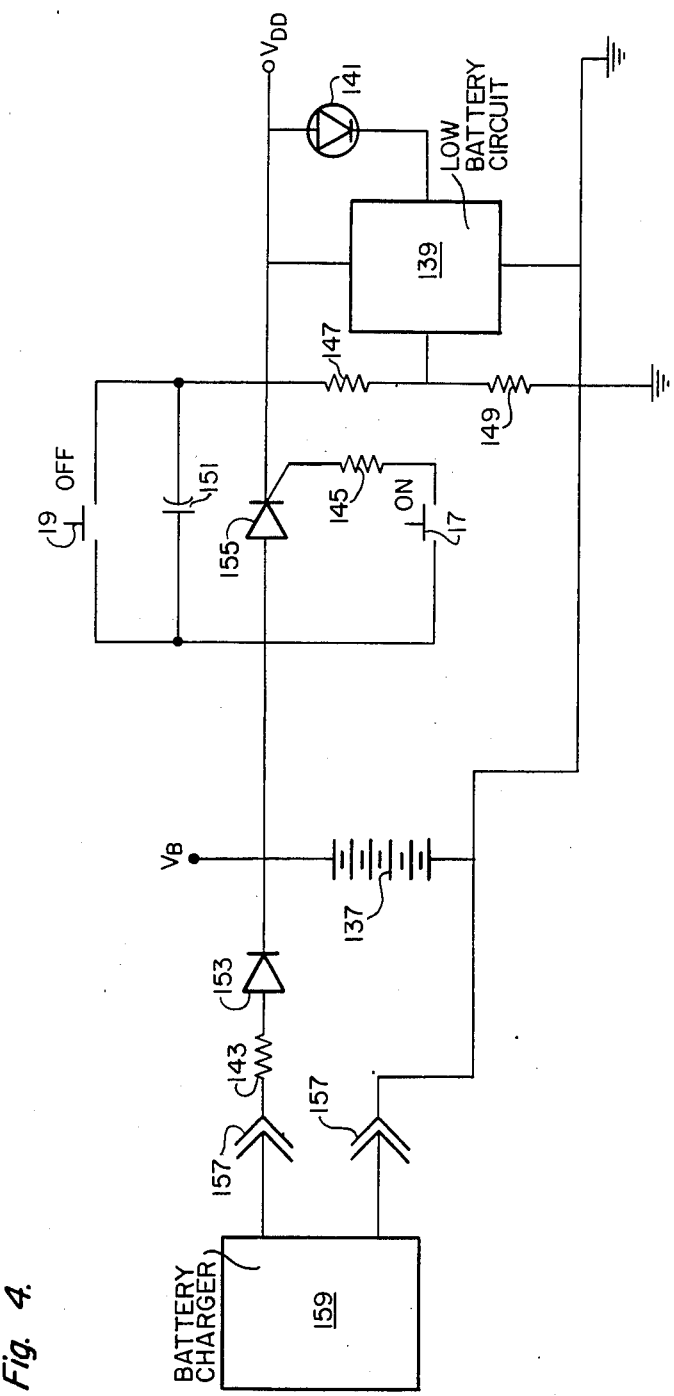
FIG. 4 is a schematic view of a circuit for incorporation into the circuit of FIG. 3 to provide for operation of the device by rechargeable batteries.

FIG. 4 illustrates a power supply for operation of the device, which circuit includes a:

(a) power on switch 17;
(b) power off switch 19;
(c) battery 137;
(d) low battery circuit 139;
(e) light-emitting diode 141;
(f) resistors 143, 145, 147, 149;
(g) capacitor 151;
(h) diode 153;
(i) silicon-controlled rectifier (SCR) 155;
(j) connector 157 to facilitate recharging by a battery charger 159.

Resistor 143 and diode 153 limit and rectify the current from battery charger 159. Switches 17 and 19, capacitor 151, resistor 145, and SCR 155 together provide the means for switching the power on and off. Resistors 147 and 149, light-emitting diode 141, and low battery circuit 139 together provide for a low battery warning.

I claim:

1. A well indicating device, for use with a microtiter plate that contains a plurality of substance-receiving wells, which comprises
   (i) a housing, having a top wall;
   (ii) an indicator display board, on the housing top wall, that contains light-emitting diodes for use in identifying individual wells in a transparent or translucent microtiter plate use in conjunction with the device;

(iii) an alignment means on the housing top wall, for positioning the microtiter plate with respect to the light emitting diodes on the indicator display board, so that individual wells in the microtiter plate may be identified and illuminated via light transmitted from a light-emitting diode through the bottom of an individual well in the microtiter plate;

(iv) a control means connected to or located in the housing, including a power switch adapted to be connected to an electric power source for energizing the device and an event swtich for operating the light-emitting diodes; and (v) an electronic circuit in the housing actuated by the event switch for operating the light-emitting diodes one at a time in a predetermined sequece, to individually identify each substance-receiving well of the microtiter plate which is the subject of manipulation.

2. The device of claim 1 wherein the electronic circuit is adapted to illuminate the light-emitting diodes sequentially in a sequence in which a diode next adjacent to the diode last lit is lit upon actuation of the event switch.

3. The device of claim 1 wherein the indicator display board contains light emitting diodes arranged in a matrix, corresponding to the arrangement of wells in a conventional 96-well microtiter plate.

4. The device of claim 3, which further comprises a selector switch in the control means, which switch in one position provides for sequencing of successive light-emitting diodes in each longitudinal row of diodes consecutively and, in a second position, provides for sequencing of successive light-emitting diodes in adjacent of such longitudinal rows of said diodes.

5. The device of claim 1, which further comprises a reset switch in the control means, for use in extinguishing light-emitting diodes and for causing the electronic circuit to operate the light-emitting diodes from the beginning of its predetermined sequence.

6. The device of claim 1, which further comprises a fast forward switch in the control means, for use in rapid forward sequencing of illuminating the light-emitting diodes.

7. The device of claim 1, which further comprises an audible buzzer in the control means that is operated coincident to each actuation of the event switch.

* * * * *